UNITED STATES PATENT OFFICE.

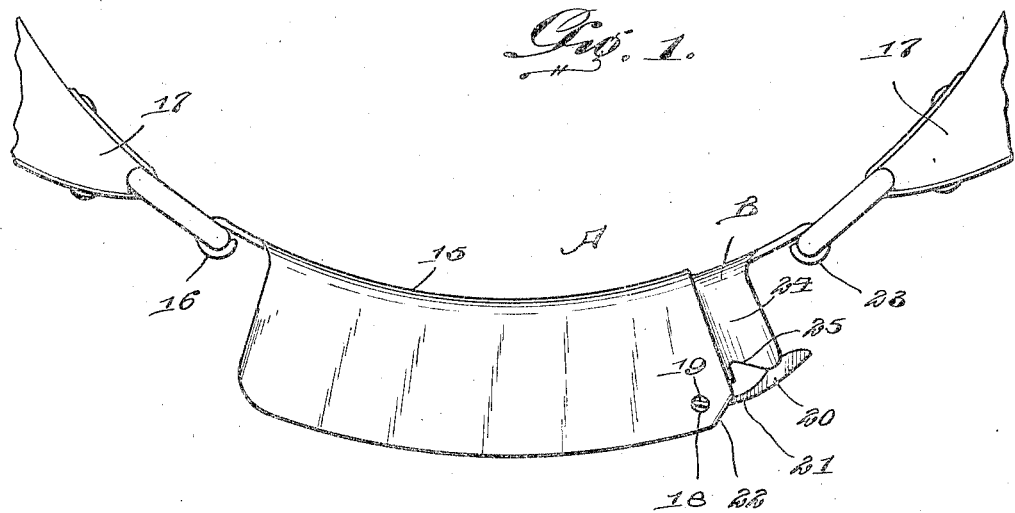
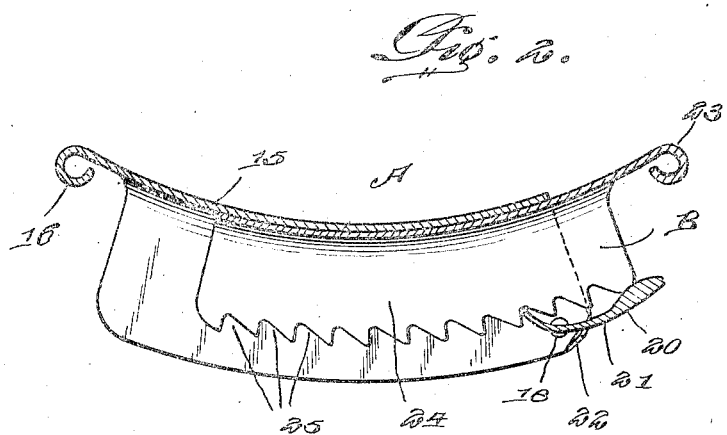

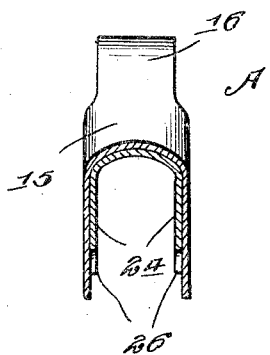
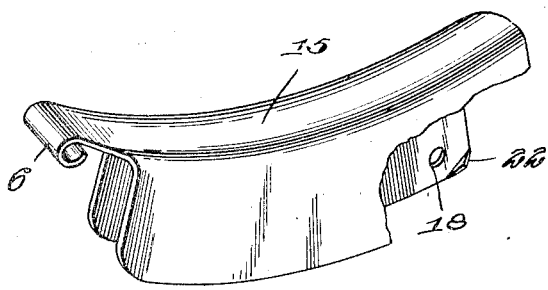
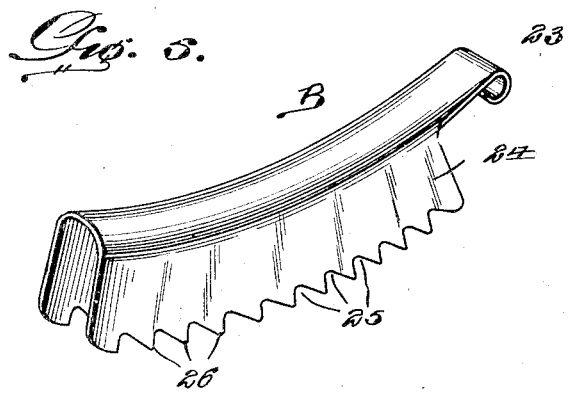

THOMAS J. ARNOLD, OF ORANGE, TEXAS.

HAME-FASTENER.

1,357,923.    Specification of Letters Patent.    Patented Nov. 2, 1920.

Application filed June 20, 1919. Serial No. 305,555.

*To all whom it may concern:*

Be it known that I, THOMAS J. ARNOLD, a citizen of the United States, residing at Orange, in the county of Orange and State of Texas, have invented new and useful Improvements in Hame-Fasteners, of which the following is a specification.

This invention relates to that class of devices which are known as hame fasteners, and it has for its object to simplify and improve the construction of the same.

A further object of the invention is to produce a simple and improved hame fastener which may be readily adjusted so as to make a tight or loose connection between the hames as desired.

A still further object of the invention is to produce an adjustable hame fastener, the parts of which may be readily separated when the hames are to be removed.

A further object of the invention is to produce a hame fastener comprising two separably connected members one of which having pivotally secured thereto a dog having a weighted handle portion that normally engages with the other member, means being provided upon the member carrying the dog for limiting the swinging movement of the dog in one direction, said dog being operable by contact with the finger of the operator for swinging the same in another direction and when in the last mentioned position permitting the adjustment of the members comprising the fastener.

With the above and other objects in view, the invention consists in the novel features, details of construction and combination of parts which will be hereinafter fully described and particularly pointed out in the claim.

In the accompanying drawing there has been illustrated a simple and preferred form of the invention, it being, however, understood that no limitation is necessarily made to the precise structural details therein exhibited, but that changes, alterations and modifications within the scope of the claim may be resorted to when desired.

In the drawings:

Figure 1 is a side elevation showing a portion of the lower ends of a pair of hames equipped with the improved fastener.

Fig. 2 is a vertical sectional view taken on a plane intermediate the front and rear faces of the latch and parallel to the said front and rear faces.

Fig. 3 is a perspective view of the outer latch section, parts being broken away.

Fig. 4 is a transverse sectional view through the improvement, looking toward the end thereof not provided with the dog.

Fig. 5 is a perspective view of the inner slidable member of the improvement.

Corresponding parts in the several figures are denoted by like characters of reference.

The latch member, broadly indicated by the character A consists of a casing or housing of substantially U-shape in cross section and the rounded top 15 is of a curved or arcuate shape and has one of its ends extended and formed with an eye 16 for connection with the lower end of the hame 17. The side members of the housing at the lower corners thereof diagonally opposite the upper portion that is provided with the eye 16 have spaced openings therethrough indicated by the numerals 18, and these openings receive trunnions 19 provided upon the sides of a dog 20. The dog has its outer end formed with an extension or tail piece 21 which is arranged in the path of contact with the inturned edges 22 of the referred to corners of the sides of the housing. In this manner the dog is held against outward movement with respect to the housing.

The member B of the fastener consists of a slightly curved or arcuate plate which is also U-shaped in cross section and has its top member at one of its ends extended and bent upon itself to provide an eye 23. The sides 24 of the member B, at the lower edges thereof are provided with obliquely disposed indentations 25, whereby a plurality of downwardly and outwardly arranged teeth 26 are formed. The member B is adapted to fit snugly between the side walls of the housing 4 and the teeth thereof are designed to be engaged by the active end of the dog 21.

When the parts are assembled by pushing the member B endwise into the housing A the lower ends of the teeth 26 will ride over the active or toothed end of the dog 21. The tail or finger portion of the dog is weighted so that the toothed portion thereof is normally swung to engage between the teeth of the member B. The tail of the dog is of a width sufficient to permit of the same being received in the member B when the dog is to be swung to inactive position, to permit of the member B being drawn outwardly of the housing A, the eyes formed on the extension of the members A and B serving as levers for permitting the proper adjustment of the said members with respect to each other.

The improved hame fastener is simple in construction and is capable of ready application to any ordinary pair of hinges.

Having thus described the invention, what is claimed as new, is:—

A hame fastener including two substantially U-shaped members, one slidable in the other and having its sides formed with teeth, the outer member having its opposed corners at one of its ends inturned to provide stops, a dog pivotally secured to the said sides opposite the stops and designed to engage with the teeth of the inner member, said dog having an outwardly projected weighted tail portion that normally rests on the stops when the dog engages with the teeth of the slidable member, and the tail of the said dog being of a width to freely pass between the sides of the slidable member.

In testimony whereof I affix my signature.

THOS. J. ARNOLD.